United States Patent [19]

Hartman et al.

[11] Patent Number: 5,546,656
[45] Date of Patent: Aug. 20, 1996

[54] FABRICATION OF ROCKET THRUST CHAMBERS

[75] Inventors: Mark L. Hartman, Tequesta; Russell J. Melnick, Jupiter; Daniel A. Bales, Palm City, all of Fla.

[73] Assignee: United Technologies Corporation, Hartford, Conn.

[21] Appl. No.: 346,646

[22] Filed: Nov. 30, 1994

[51] Int. Cl.⁶ ..................................................... B23P 15/00
[52] U.S. Cl. ................................. 29/890.01; 29/890.38; 165/170
[58] Field of Search .......................... 29/890.01, 890.038, 29/890.04, 890.043, 890.042, 890.053; 165/170, 166, 134.1; 228/193, 195, 183, 181

[56] References Cited

U.S. PATENT DOCUMENTS

| | | | |
|---|---|---|---|
| 2,968,918 | 1/1961 | Denison, Jr. | 29/890.01 |
| 3,644,974 | 2/1972 | Simon | 29/890.01 |
| 4,582,678 | 4/1982 | Niino et al. | 29/890.01 |
| 4,584,171 | 4/1982 | Niino et al. | 29/890.01 |
| 4,942,653 | 7/1990 | Hawkinson | 29/890.01 |
| 5,233,755 | 8/1993 | Vandendriessche | 29/890.01 |
| 5,249,357 | 10/1993 | Holmes et al. | 29/890.01 |
| 5,371,945 | 12/1994 | Schnoor | 29/890.01 |
| 5,375,325 | 12/1994 | Bales et al. | 29/890.01 |

*Primary Examiner*—Irene Cuda
*Attorney, Agent, or Firm*—Christopher T. Hayes

[57] ABSTRACT

A method of producing a rocket thrust chamber in which cooling tubes are positioned within a structural jacket to form a tube bundle, and a liner is positioned within the tube bundle thereby sandwiching the tubes between the jacket and the liner. The tubes are then subjected to high internal pressure and inflated while the liner is simultaneously subjected to the same high pressure, thereby forcing the tubes into intimate contact with adjacent tubes, the liner and the jacket. The tubes, liner and jacket are then subjected to ultrasonic vibrations to bond the tubes and jacket into an integral structure.

13 Claims, 6 Drawing Sheets

FABRICATION OF ROCKET THRUST CHAMBERS

DESCRIPTION

1. Field of the Invention

This invention is related to heat exchangers, and particularly to a process for forming tubular heat exchangers used in rockets.

2. Background of the Invention

Rocket engines, such as those used on space missions, are costly to design and manufacture. In addition, there is a continuing and growing need for rockets capable of carrying payloads to space or near-Earth orbits. Consequently, manufacturers of such rocket engines are constantly seeking new ways to reduce the cost of producing the components which go into a rocket engine.

One such component is the rocket thrust chamber within which the propellants of the rocket engine are combusted and accelerated. Because of the extremely high temperatures of the propellants moving through the thrust chamber, the walls of the thrust chamber must be cooled in those applications which require sustained engine firings. Such cooling is typically accomplished by flowing a coolant through tubes or channels which form the inner wall of the thrust chamber.

A typical example of such thrust chambers is shown in U.S. Pat. No. 3,208,132 to Escher, which discloses a rocket chamber produced by forming coolant flow passages within two sheets by an explosive forming process. The formed sheets must be subsequently welded or brazed together to form individual flow passages, and the integrity of these welds is difficult to inspect. U.S. Pat. No. 3,190,070 to Neu discloses a rocket chamber formed from a plurality of pre-formed coolant tubes. The tubes must be manufactured to close tolerances to ensure that the resulting tube bundle adequately shields the structural jacket of the chamber from the combustion products. U.S. Pat. No. 3,595,025 to Stockel et al discloses a rocket chamber liner having grooves which, when mated with a structural jacket, form cooling channels. These grooves must be machined into the liner, and therefore require a significant amount of labor to produce.

What is needed is a method of making a rocket thrust chamber which permits less exacting tube tolerances, is less labor intensive than the prior art, and is readily inspectable.

SUMMARY OF THE INVENTION

It is therefore an object of the present invention to provide a process for forming a rocket thrust chamber which provides for secure bonds between adjacent coolant tubes and a simple manufacturing technique.

According to the preferred embodiment of the present invention, a plurality of tubes are placed side by side against a structural jacket forming a tube bundle therein. Each end of each robe is sealed to the jacket, and a liner is placed within the tube bundle and sealed to the jacket. The entire apparatus is then placed into a cold isostatic pressure (CIP) chamber. The CIP chamber is pressurized to a pressure at which the tubes can be readily subjected to substantial plastic or superplastic deformation, thereby causing the tubes to expand and deform into intimate contact with the structural jacket and the adjacent tubes, and causing the liner to deform and expand into intimate contact with the tubes. The structural jacket, tubes, and liner are subjected to ultrasonic vibrations at a frequency and amplitude sufficient to cause each of the tubes and the immediately adjacent tubes and the liner to deform into intimate contact, resulting in atomic bonding. The pressure is maintained until the tubes have bonded to each other, the liner and the structural jacket. The tubes, liner and the structural jacket are then returned to ambient conditions. A first alternate embodiment is disclosed in which the liner of the preferred embodiment does not become bonded to the tubes during the bonding of the tubes and jacket. In a second alternate embodiment, the liner is replaced by a two-piece mandrel which can be removed from the thrust chamber once the bonding is complete.

The foregoing and other features and advantages of the present invention will become more apparent from the following description and accompanying drawings.

BEST MODE FOR CARRYING OUT THE INVENTION

Figure 1:
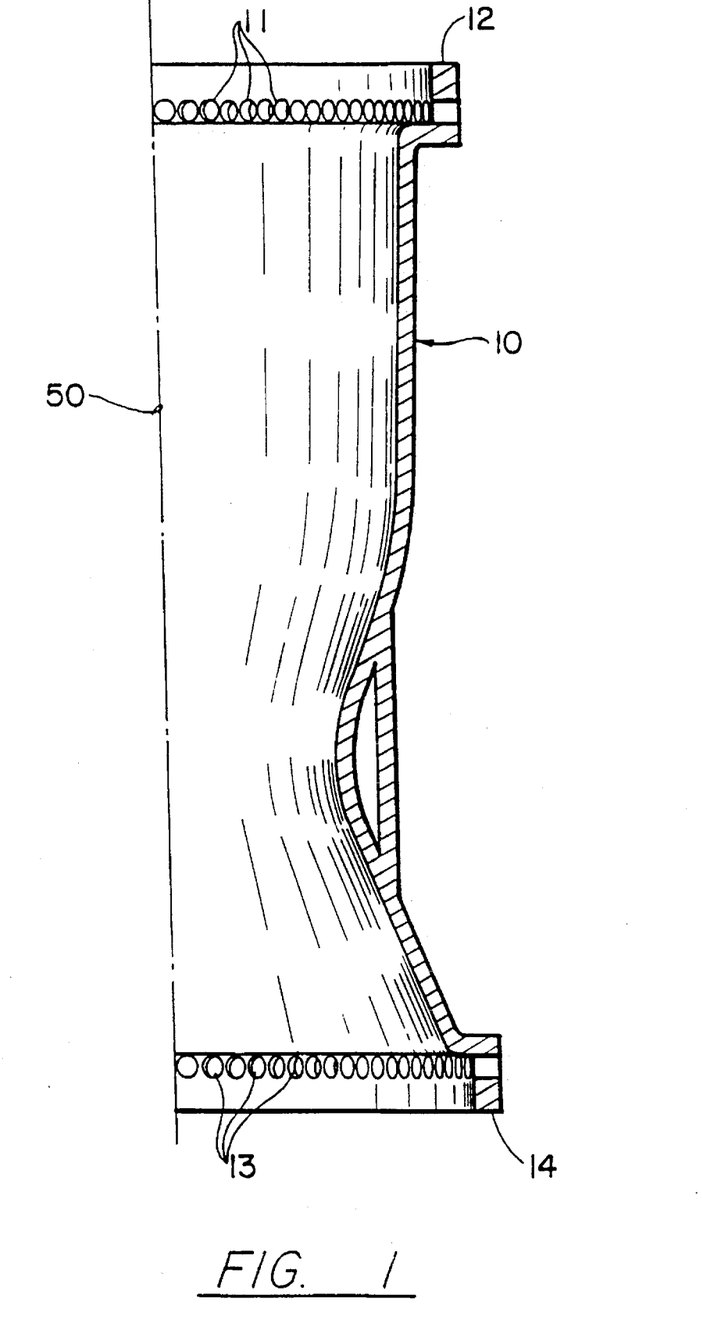
FIG. 1 is a cross-sectional view of the structural jacket of the rocket thrust chamber of the present invention.

A structural jacket 10 of a rocket thrust chamber of the present invention is shown in FIG. 1 with an axial centerline 50 defined therethrough. Although the present invention is shown and described in terms of a rocket thrust chamber, such discussion is for exemplary purposes only and is not intended to limit the scope of the claims. The structural jacket 10 includes a plurality of inlet manifold holes 11 radially encompassing and adjacent one end 12 of the jacket 10 and an equal number of manifold exit holes 13 radially encompassing and adjacent the opposite end 14 of the structural jacket 10. The inner surface 15 of the jacket is coated with a layer of bonding material such as copper. Due to its structural nature, the jacket 10 is preferably made of a high tensile material such as stainless steel.

Figure 2:
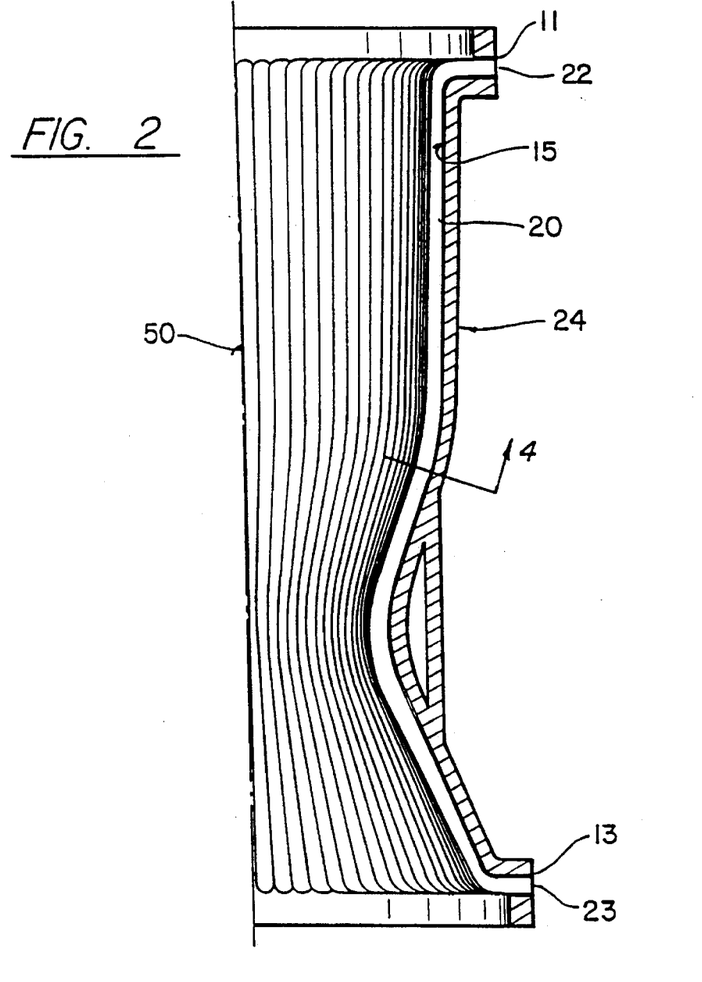
FIG. 2 shows the structural jacket of FIG. 1 showing one of the tubes positioned therein.
Figure 3:
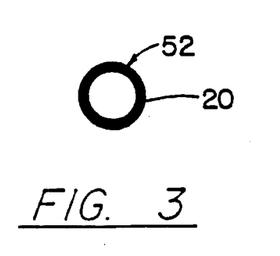
FIG. 3 is a cross-sectional view of one of the tubes.
Figure 4:
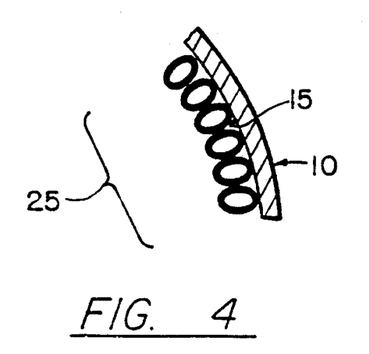
FIG. 4 is a cross-sectional view of the assembly in FIG. 2 taken along line 4—4.

In the preferred embodiment, a plurality of tubes 20, each having an outer diameter slightly less than the inlet and outlet holes 11, 13, are formed into a shape which conforms to the axial profile of the inner surface 15 of the structural jacket 10, as shown in FIG. 2. The tubes 20 are preferably made of a high conductivity material such as copper or a copper alloy. Each tube 20 is placed within the structural jacket 10 so that the tube 20 extends axially along the structural jacket 10. One end 22 of each tube 20 is then inserted through one of the inlet holes 11 and the other end 23 is inserted through one of the outlet holes 13. The ends 22, 23 of each tube 20 is then sealed to the structural jacket 10, preferably by welding, thereby preventing communication between the inner and outer surfaces 15, 24 of the structural jacket 10 through the inlet and outlet holes 11, 13. The axially aligned tubes 20 thus form a tube bundle 25 along the inner surface 15 of the structural jacket 10, a cross-section of which is shown in FIG. 4.

Figure 5:
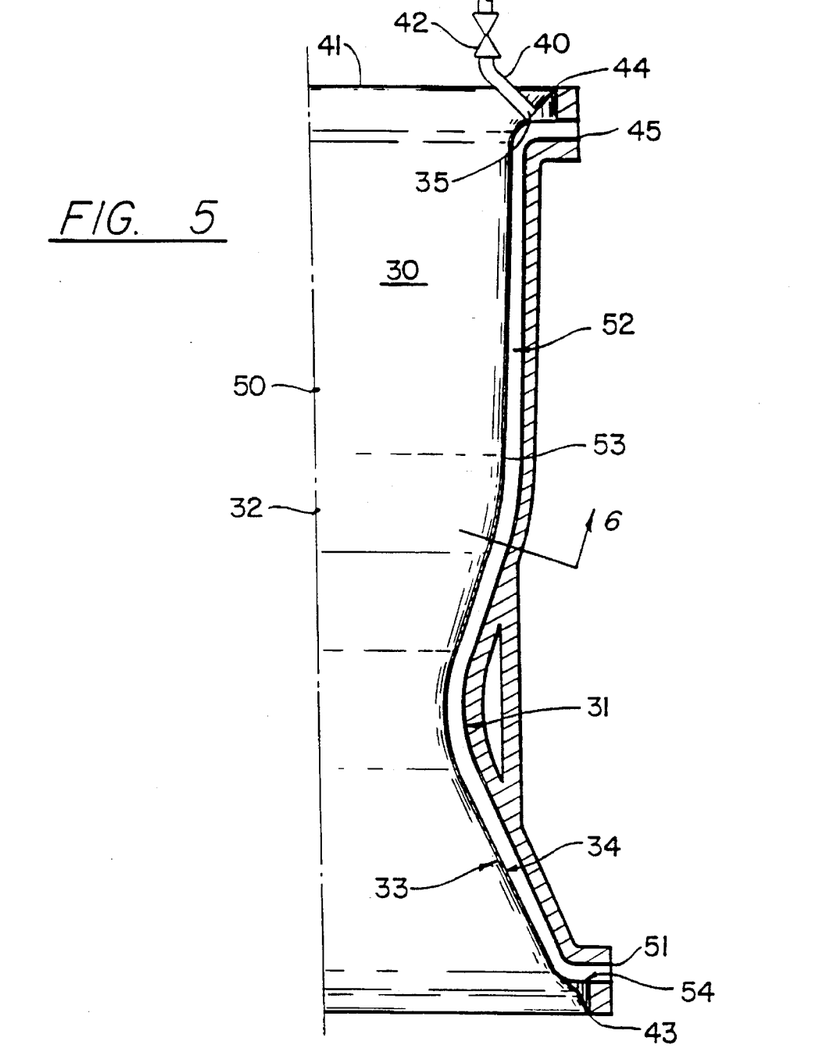
FIG. 5 shows the structural jacket and tubes of FIG. 2 with the liner positioned therein.

With the tubes 20 secured to the jacket 10, a liner 30, somewhat cylindrical in shape is inserted into the tube bundle 25 as shown in FIG. 5. The liner 30 is essentially a "bag" preferably made of a material having high thermal conductivity, such as copper or copper alloy. The thickness of the liner 30 is preferably only 0.010–0.015 (0.254–0.381 millimeters) thick, making the "bag" malleable enough to be squeezed through the throat 31 of the jacket 10 without fracturing the liner 30. The liner 30 has a longitudinal axis 32 which is coaxial with the axial centerline 50 and inner face 33 and an outer face 34. The liner 30 includes at least one purge port 35 in the outer surface 34 thereof, and a purge line 40 connected to the purge port 35 extends from the outer face 34 and out through an end 41 of the liner 30. The purge line 40 includes a valve 42 for selectively opening or closing the purge line 40.

Figure 6:
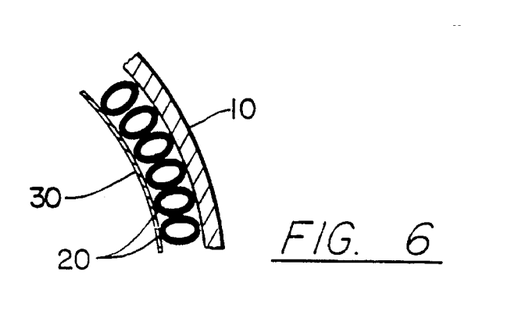
FIG. 6 is a cross-sectional view of the assembly in FIG. 5 taken along line 6—6.

With the liner 30 located within the tube bundle 25, the liner 30 is sealed to the ends 12, 14 of the jacket 10 about the circumference thereof, preferably by electron beam welding. As a result of the electron beam welds 43, 44 sealing the liner 30 to the jacket 10, and the sealing welds 45, 51 of each of the tube ends 22, 23 into one of the inlet or outlet holes 11, 13, an isolated volume 53 is defined bounded by the outer face 34 of the liner 30, the inner surface 15 of the jacket 10, and the outer surface 52 of each of the tubes 20. This isolated volume 53 communicates with the outer surface 24 of the jacket 10 solely through the valved purge line 40. Likewise, the inner surface 54 of each tube 20, the outer surface 24 of the jacket 10, and the inner face 33 of the liner 30 are always at ambient pressure. At this point, the tubes 20 may be checked for leaks by drawing a vacuum on the purge line 40 and passing a helium gas wand around the jacket 10 and liner 30, and using detection equipment in the vacuum apparatus to determine whether helium is leaking into the isolated volume 53. Once it has been determined that no leaks are present, the purge line 40 may be used to perform hydrogen scrub cycles, and then the purge line 40 is used to evacuate the gas from the isolated volume 53. Once evacuated, the valve 42 in the purge line 40 is closed, thereby isolating the tube outer surfaces 52, the structural jacket inner surface 15 and the liner outer face 34 from atmospheric pressure. The resulting configuration of the liner, tubes, and jacket, is shown in cross-section in FIG. 6.

Figure 7:
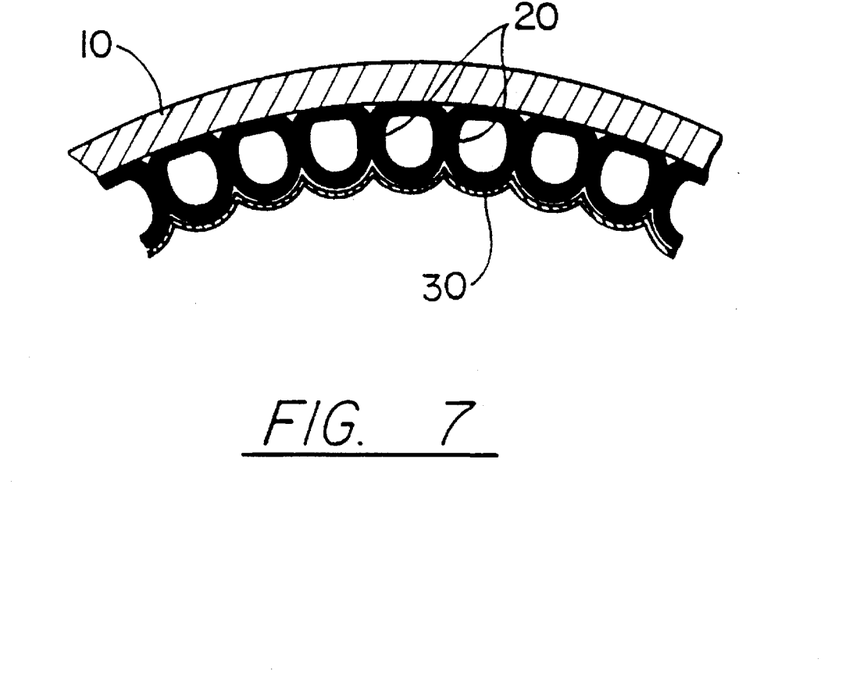
FIG. 7 is the cross-sectional view of FIG. 6 showing the deformation of the tubes against the jacket, and the deformation of the liner against the tubes.
Figure 8:
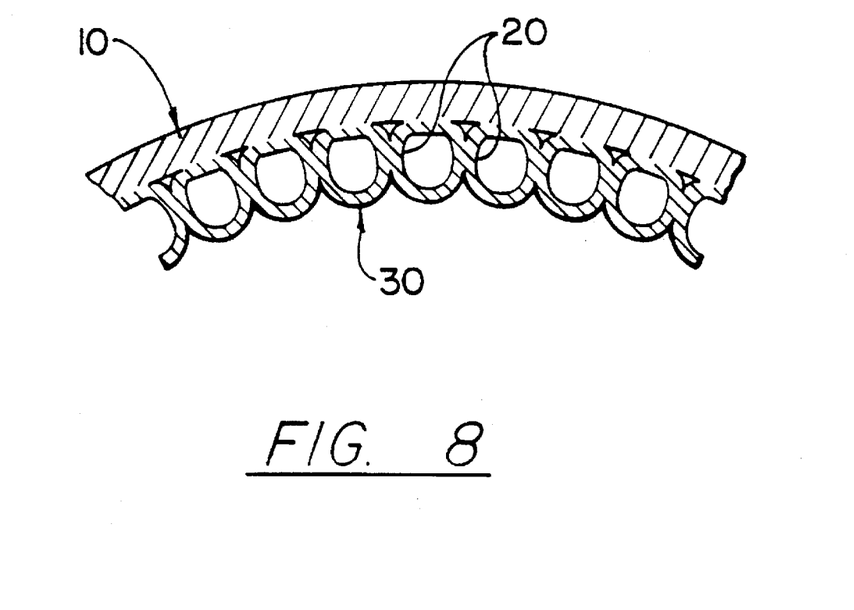
FIG. 8 is the view in FIG. 7 after bonding of the tubes, jacket and liner.

At this point the assembly is placed into a CIP chamber and the chamber is pressurized to high pressure (typically 60 ksi) at which plastic or superplastic deformation of the tubes 20 can occur, thus pressurizing each tube 20. Since the outer surface 52 of each tube 20 is acted upon by a vacuum, each tube 20 "inflates", causing the tube to expand into intimate contact with the adjacent tubes 20, jacket 10, and liner 30. The inner face 33 of the liner 30 is likewise acted upon by a much higher pressure than the outer face 34, causing the liner 30 to "inflate" into the intimate contact with the tubes 20, deforming the liner 30 into a scalloped contour formed by the tubes 20 as shown in FIG. 7. The assembly is then subjected to ultrasonic vibration at an amplitude which causes deformation at the points of contact between each tube 20 and the tubes 20 immediately adjacent thereto and between each tube 20, the structural jacket 10, and the liner 30. Such ultrasonic bonding is known in the art and the specifics thereof are therefore beyond the scope of the present invention. Ultrasonic welding units are commercially available from manufacturers such as Branson Ultrasonics Corporation of Danbury, Conn. This ultrasonic vibration causes substantial localized deformation sufficient to locally bond each tube 20 to the tubes 20, structural jacket 10, and the liner 30 in contact therewith, and the ultrasonic vibration is then terminated. The resulting bonded assembly 55 is shown in FIG. 8. After the bonding is completed, pressure are reduced to ambient and the assembly 55 is removed from the CIP chamber. The resulting thrust chamber is an integral liner 30, tube bundle 25 and jacket 10. Any portion of the tube ends 22, 23 which extends outward from the inlet and outlet holes 11, 13 may be machined away to achieve a smooth orifice manifold. As those skilled in the art will readily appreciate, the pressurization and ultrasonic bonding may be done simultaneously, and in the event that the tubes 20 are made of a material which cannot be ultrasonically bonded, the tubes 20 can be coated with a bonding material such as copper, thereby obtaining the benefits of the present invention without being restricted to tubes 20 made of material which can be ultrasonically bonded.

In some rocket applications the heat flux through the liner 30 may be so great that it becomes desirable to eliminate the liner 30 from the thrust chamber altogether. Accordingly, in a first alternate embodiment of the present invention, the liner 30 may be coated with a releasing agent to prevent bonding between the liner 30 and the tubes 20. The procedure described for the preferred embodiment is then followed as set forth above, except that the liner 30 is removed from the assembly 55 once the ultrasonic bonding is complete.

Figure 9:
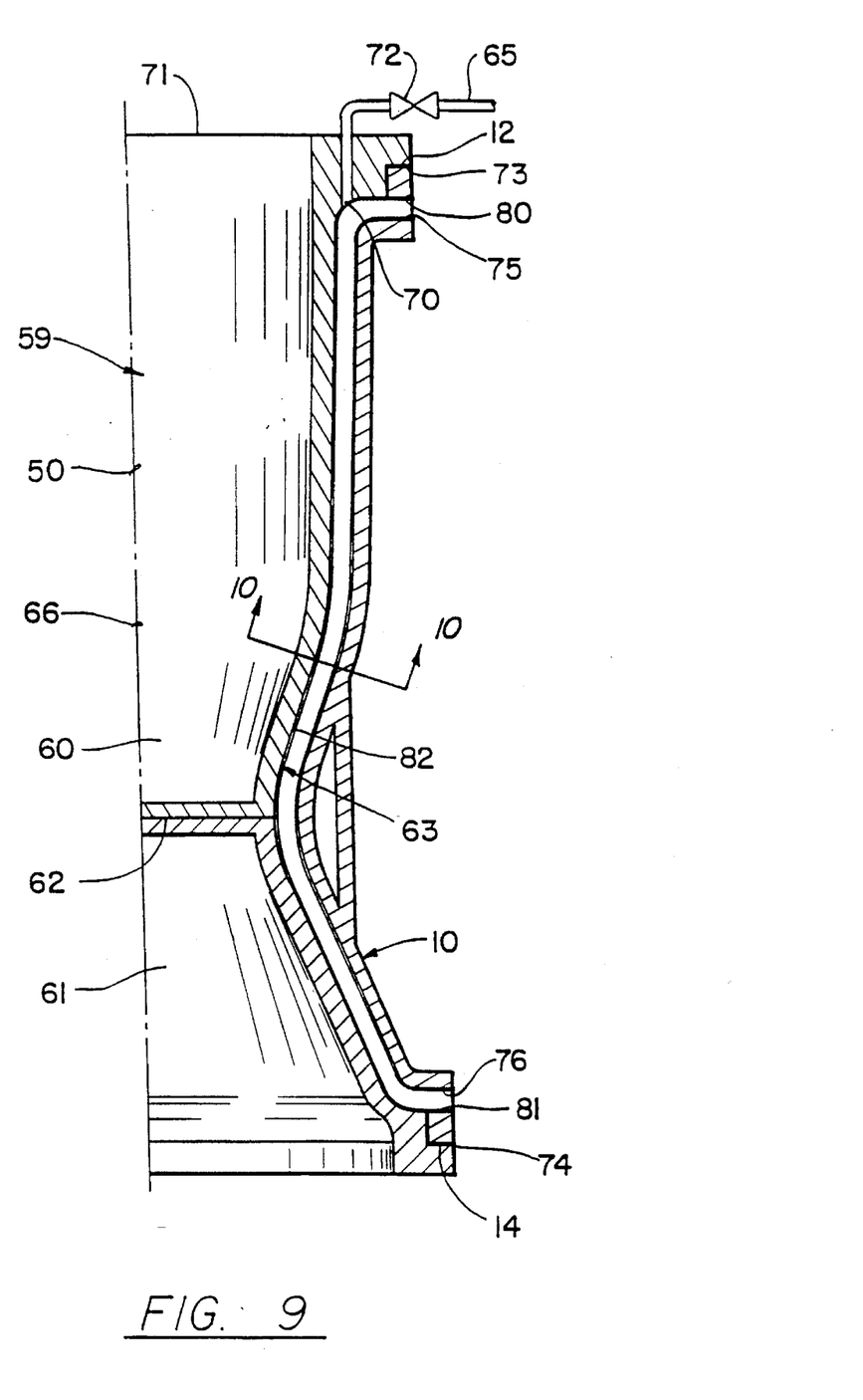
FIG. 9 is a cross-sectional view of the structural jacket and tubes of the second alternate embodiment with the mandrel positioned therein.
Figure 10:
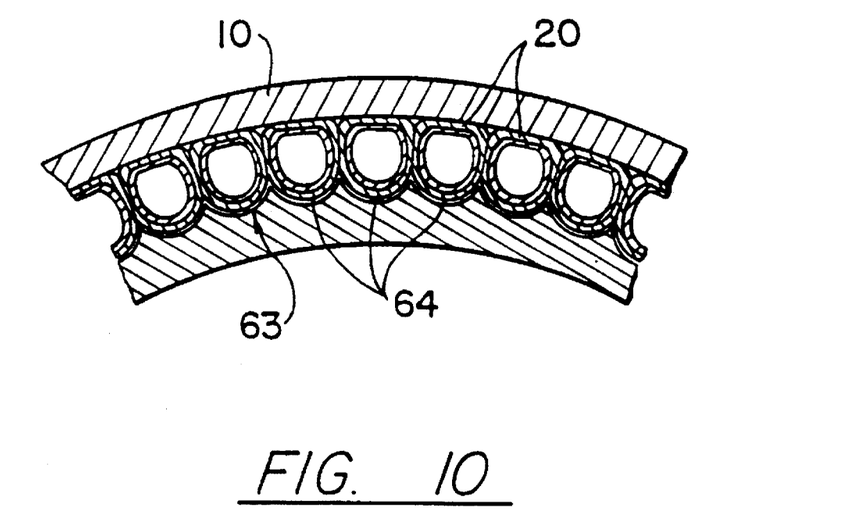
FIG. 10 is a cross-sectional view taken along line 10—10 of FIG. 9 showing the deformation of the tubes between the jacket and the mandrel.
Figure 11:
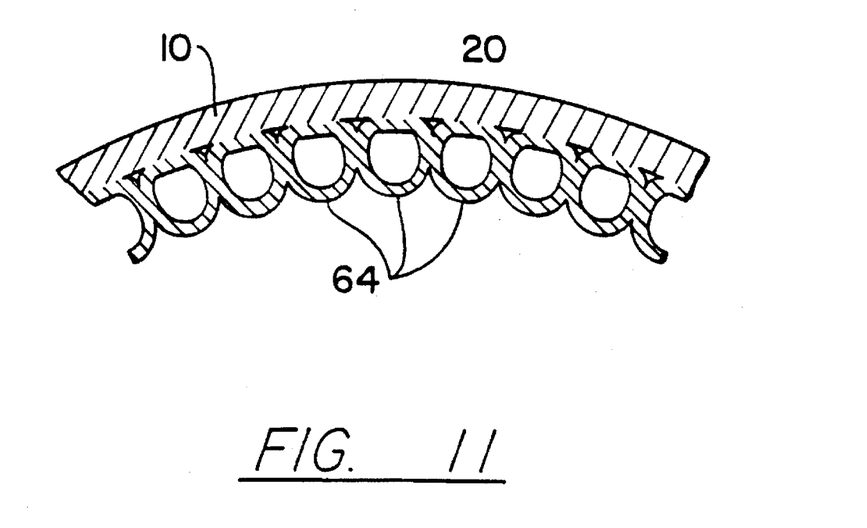
FIG. 11 is the view in FIG. 10 after bonding of the tubes and jacket, and removal of the mandrel.

A second alternate embodiment of the present invention is shown in FIGS. 9–11. The second alternate embodiment of the present invention is similar to the preferred embodiment except that instead of positioning a liner 30 within the tube bundle 25, a two-piece mandrel 59 is inserted into the tube bundle 25 as shown in FIG. 9. The mandrel 59 has a longitudinal axis 66 which extends along the axial centerline 50 of the structural jacket 10, and the first piece 60 joins to the second piece 61 at the narrowest diameter 62 along the longitudinal axis 66. The outer face 63 of the mandrel 59 is scalloped with a plurality of troughs 64, and the number of troughs 64 is equal to the number of tubes 20, as shown in FIG. 10. The outer face 63 of the mandrel 59 is preferably coated with a releasing agent and includes at least one purge line 65 extending from a purge port 70 in the scalloped face 63 through an end 71 of the mandrel 59. As in the preferred embodiment, the purge line 65 includes a valve 72 for selectively opening or closing the purge line 65.

With the two-piece mandrel 59 located within the tube bundle 25, the ends 12, 14 of the jacket 10 are sealed to the mandrel 59 about the circumference thereof, preferably by electron beam welding. As a result of the electron beam welds 73, 74 sealing the mandrel 59 to the jacket 10, and the sealing welds 75, 76 of each of the tube ends 80, 81, into one of the inlet or outlet holes 11, 13, an isolated volume 82 like the one discussed above is created, with the mandrel 59 substituting for the liner as a boundary. Accordingly, the inner surface 25 of each tube, the outer surface of the jacket 10, and the outer face 63 of the mandrel 59 are always at ambient pressure. The isolated volume 82 may be checked for leaks, hydrogen scrub cycles performed, and the gas evacuated from the isolated volume 82 and the valve 72 closed, all as described above.

The assembly is then placed into a CIP chamber and raised to a required temperature at which plastic or superplastic deformation of the tubes 20 can occur. The chamber is then pressurized to high pressure (typically 60 ksi) and each tube 20 "inflates" as discussed in the preferred embodiment, causing the tube 20 to expand into intimate contact with the adjacent tubes 20, jacket 10, and scalloped outer face 63 of the mandrel 59. The assembly is then bonded by ultrasonic vibration as described in the preferred embodiment such that each tube 20 bonds to the adjacent tubes 20 and to the structural jacket 10. As discussed above, the pressurization and ultrasonic bonding need not be sequential, and may therefore be performed simultaneously. The tubes 20 do not bond to the mandrel 59 because of the releasing agent which prevents the tubes 20 from bonding within the troughs 64. After the bonding is completed, the pressure is reduced to ambient and the assembly is removed from the CIP chamber. The circumferential welds 73, 74 are then machined from the structural jacket 10, allowing the mandrel 59 to be removed. The resulting thrust chamber is a tube bundle and integral jacket as shown in FIG. 11. Any portion of the tube ends which extends outward from the inlet and outlet holes may be machined away to achieve a smooth orifice manifold.

It should be understood that to enhance the bonding process, in the preferred embodiment and each of the alternate embodiments, a coating material may be used on the structural jacket inner diameter, the outer diameter of the tubes, and, in the preferred embodiment, the outer diameter of the liner. In order to further reduce the weight of the rocket thrust chamber discussed herein, the jacket 10 in any of the aforementioned embodiments may be made of a composite material, such as copper graphite, instead of stainless steel. The particular composite material selected for the jacket 10 must be compatible with the bonding material of which the tubes are made (or coated with).

Although this invention has been shown and described with respect to detailed embodiments thereof, it will be understood by those skilled in the art that various changes in form and detail thereof may be made without departing from the spirit and scope of the claimed invention.

We claim:

1. A method of making a rocket chamber having tubular passages therein comprising:

providing a structural jacket having first and second opposed ends and a plurality of first and second holes extending through the jacket adjacent the first and second ends, respectively, said jacket having inner and outer surfaces, said inner surface coated with a bonding material;

positioning a plurality of tubes within the jacket, each tube having an outer surface comprising said bonding material, each tube having a first tube end positioned in one of the first holes and a second tube end positioned in one of the second holes, thereby forming a tube bundle;

sealingly welding the jacket to each tube end at each hole thereby preventing communication between the inner and outer surfaces of the structural jacket through the first and second holes;

positioning a mandrel within the tube bundle mandrel having a purge port extending therethrough and a purge line connected to said purge port;

sealingly welding the perimeter of the first and second ends of the jacket to the mandrel, thereby defining an isolated volume bounded by the mandrel, the jacket, and the outside of each of the tubes, said isolated volume communicating with the outer surface of the jacket solely through a purge line;

evacuating the isolated volume and sealing the purge line; and, placing the jacket, tubes and mandrel as an assembly into a cold isostatic pressure chamber and raising the pressure of the chamber to a pressure at which plastic or superplastic deformation of the tubes can take place thereby inflating each of the tubes and expanding each of the tubes into intimate contact with immediately adjacent tubes, the inner surface of the jacket, and the mandrel, and subjecting the assembly to ultrasonic vibrations at a frequency and amplitude sufficient to cause deformation at contact points between each of the tubes and the immediately adjacent tubes, the liner, and the inner surface of the jacket in contact therewith, said deformation causing atomic bonding at the contact points.

2. The method of claim 1 wherein the mandrel has a coating of release agent to prevent the tubes from bonding to the mandrel.

3. The method of claim 2 wherein the mandrel has a longitudinal axis defined therethrough and a scalloped outer face including a plurality of axially extending troughs equal in number of tubes, and the purge line communicates with the outer face, extends through the mandrel, and protrudes therefrom through a second face of the mandrel.

4. The method of claim 3 wherein the purge line includes a valve for selectively opening and closing the purge line.

5. The method of claim 4 wherein the bonding material is copper.

6. A method of making a rocket chamber having tubular passages therein comprising:

providing a structural jacket having first and second opposed ends and a plurality of first and second holes extending through the jacket adjacent the first and second ends, respectively, said jacket having inner and outer surfaces, said inner surface coated with a bonding material;

positioning a plurality of tubes within the jacket, each tube having an outer surface comprising said bonding material, each tube having a first tube end positioned in one of the first holes and a second tube end positioned in one of the second holes, thereby forming a tube bundle;

sealingly welding the jacket to each tube end at each hole thereby preventing communication between the inner and outer surfaces of the structural jacket through the first and second holes;

positioning a liner within the tube bundle, said liner coated with the bonding material and having a purge port extending therethrough and a purge line connected to said purge port;

sealingly welding the perimeter of the first and second ends of the jacket to the liner, thereby defining an isolated volume bounded by the liner, the jacket, and the outside of each of the tubes, said isolated volume communicating with the outer surface of the jacket solely through the purge line;

evacuating the isolated volume and sealing the purge line; and, placing the jacket, tubes and liner as an assembly into a cold isostatic pressure chamber and raising the pressure of the chamber to a pressure at which plastic or superplastic deformation of the tubes and liner can occur, thereby inflating each of the tubes into intimate contact with immediately adjacent tubes, the inner surface of the jacket, and the liner while simultaneously inflating the liner into intimate contact with the tubes, and subjecting the assembly to ultrasonic vibrations at a frequency and amplitude sufficient to cause deformation at contact points between each of the tubes and the immediately adjacent tubes, the liner, and the inner surface of the jacket in contact therewith, said deformation causing atomic bonding at the contact points.

7. The method of claim 6 wherein the jacket is made of a composite material.

8. The method of claim 7 wherein the purge line includes a valve for selectively opening and closing the purge line.

9. The method of claim 8 wherein the bonding material is copper.

10. A method of making a rocket chamber having tubular passages therein comprising:

provkling a structural jacket having first and second opposed ends and a plurality of first and second holes extending through the jacket adjacent the first and second ends, respectively, said jacket having inner and outer surfaces, said inner surface coated with a bonding material;

positioning a plurality of tubes within the jacket, each tube having an outer surface comprising said bonding material, each tube having a first tube end positioned in one of the first holes and a second tube end positioned in one of the second holes, thereby forming a tube bundle;

sealingly welding the jacket to each tube end at each hole thereby preventing communication between the inner and outer surfaces of the structural jacket through the first and second holes;

positioning a liner within the tube bundle, said liner coated with a releasing agent and having a purge port extending therethrough and a purge line connected to said purge port;

sealingly welding the perimeter of the first and second ends of the jacket to the liner, thereby defining an isolated volume bounded by the liner, the jacket, and the outside of each of the tubes, said isolated volume communicating with the outer surface of the jacket solely through the purge line;

evacuating the isolated volume and sealing the purge line;

placing the jacket, tubes and liner as an assembly into a cold isostatic pressure chamber and raising the pressure of the chamber to a pressure at which plastic or superplastic deformation of the tubes and liner can occur, thereby inflating each of the tubes into intimate contact with immediately adjacent tubes, the inner surface of the jacket, and the liner while simultaneously inflating the liner into intimate contact with the tubes, and subjecting the assembly to ultrasonic vibrations at a frequency and amplitude sufficient to cause deformation at contact points between each of the tubes and the immediately adjacent tubes and the inner surface of the jacket in contact therewith, said deformation causing atomic bonding at the contact points; and, removing the liner from the tube bundle.

11. The method of claim 10 wherein the jacket is made of a composite material.

12. The method of claim 11 wherein the purge line includes a valve for selectively opening and closing the purge line.

13. The method of claim 12 wherein the bonding material is copper.

* * * * *

UNITED STATES PATENT AND TRADEMARK OFFICE
CERTIFICATE OF CORRECTION

PATENT NO. : 5,546,656
DATED : August 20, 1996
INVENTOR(S) : Mark L. Hartman et al It is certified that error appears in the above-indentified patent and that said Letters Patent is hereby corrected as shown below:

In column 1, at line 56, change "robe" to --tube--.
In column 4, at line 66, delete "25".

Signed and Sealed this

Twenty-second Day of April, 1997

*Attest:*

BRUCE LEHMAN

*Commissioner of Patents and Trademarks*

*Attesting Officer*